United States Patent
Napierala et al.

(10) Patent No.: US 8,179,905 B1
(45) Date of Patent: May 15, 2012

(54) METHOD AND APPARATUS FOR PROVIDING COMMUNICATION FOR VIRTUAL PRIVATE NETWORKS

(75) Inventors: Maria Napierala, Ocean, NJ (US); James Uttaro, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 764 days.

(21) Appl. No.: 11/527,863

(22) Filed: Sep. 27, 2006

(51) Int. Cl.
*H04L 12/28* (2006.01)

(52) U.S. Cl. .............. 370/401; 370/237; 370/395.5; 370/390; 370/395.53

(58) Field of Classification Search ............. 370/228, 370/389, 238, 395.31, 390, 401, 252; 709/239, 709/232, 238
See application file for complete search history.

(56) References Cited

U.S. PATENT DOCUMENTS

| | | | |
|---|---|---|---|
| 7,023,808 B2 * | 4/2006 | Ball et al. | 370/238 |
| 7,185,107 B1 * | 2/2007 | Cassar | 709/239 |
| 7,397,802 B2 * | 7/2008 | Maeno | 370/395.31 |
| 7,787,396 B1 * | 8/2010 | Nalawade et al. | 370/254 |
| 2003/0118036 A1 * | 6/2003 | Gibson et al. | 370/401 |
| 2004/0165537 A1 * | 8/2004 | Lee et al. | 370/252 |
| 2006/0133265 A1 * | 6/2006 | Lee | 370/228 |

* cited by examiner

*Primary Examiner* — Robert Wilson
*Assistant Examiner* — Mohamed Kamara

(57) ABSTRACT

A method and apparatus for providing communication for virtual private networks in networks such as Voice over Internet Protocol (VoIP) and Service over Internet Protocol (SoIP) are disclosed. The present method enables Service Border Routers (SBRs) to perform mapping of VPN routes between two or more autonomous systems based on Virtual Route Forwarding (VRF) tables configured on each Autonomous System (AS). The method configures cross-connect tables in SBRs for coupling one or more VRF tables in one autonomous system with one or more VRF tables in other autonomous systems.

20 Claims, 4 Drawing Sheets

METHOD AND APPARATUS FOR PROVIDING COMMUNICATION FOR VIRTUAL PRIVATE NETWORKS

The present invention relates generally to communication networks and, more particularly, to a method and apparatus for providing communication for virtual private networks spanning multiple autonomous systems (ASes) in networks such as the packet networks, e.g., Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and businesses and consumers are relying on their Internet connections to obtain many of their communications services. However, the Internet is a public network and is not as reliable or secure as privately leased lines. The privately leased lines are not shared, and provide predetermined performance level and security. However, as businesses expand globally, the number of interconnected sites increases. The cost of enabling all employees and business partners to communicate via leased lines is prohibitive. Network service providers offer Virtual Private Network (VPN) services to enterprises with a need to communicate across multiple geographical areas. That is, the enterprise customers extend their network by establishing a wide area network using the VPN services offered by a network service provider. An enterprise customer may obtain multiple VPN services. The network service providers have multiple Border Gateway Protocol (BGP) autonomous systems to support their large customer base. Multiple VPNs for a customer may be provided on autonomous systems within the same Interior Gateway Protocol (IGP) or on multiple BGPs. When a customer requests multiple VPNs to be combined, e.g., due to mergers of network service providers, an inter-autonomous-system with complex BGP topology, route reflectors, route filter list, etc. is used. If the number of VPNs being combined is significantly large, then the filter lists will in turn become very large and very difficult to manage. Route reflectors may be required to handle a larger load, thereby affecting the performance of the overall network.

Therefore, there is a need for a method that provides communication for VPNs spanning multiple autonomous systems.

SUMMARY OF THE INVENTION

In one embodiment, the present invention discloses a method and apparatus for providing communication for VPNs spanning multiple autonomous systems on networks such as the packet networks. For example, a customer may subscribe to multiple virtual private network services and requests that the multiple VPNs be combined such that users may communicate in a seamless manner. In one embodiment, the present method enables Service Border Routers (SBRs) to perform mapping of VPN routes between two or more autonomous systems based on Virtual Route Forwarding (VRF) tables configured on each Autonomous System (AS). The method configures cross-connect tables in the SBRs for coupling one or more VRF tables in one autonomous system with one or more VRF tables in other autonomous systems.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing communication for virtual private networks spanning multiple autonomous systems on networks such as the packet networks, e.g., Voice over Internet Protocol (VoIP) and Service over Internet Protocol (SoIP) networks. Although the present invention is discussed below in the context of VoIP and SoIP networks, the present invention is not so limited. Namely, the present invention can be applied for other networks such as the cellular networks and the like.

Figure 1:
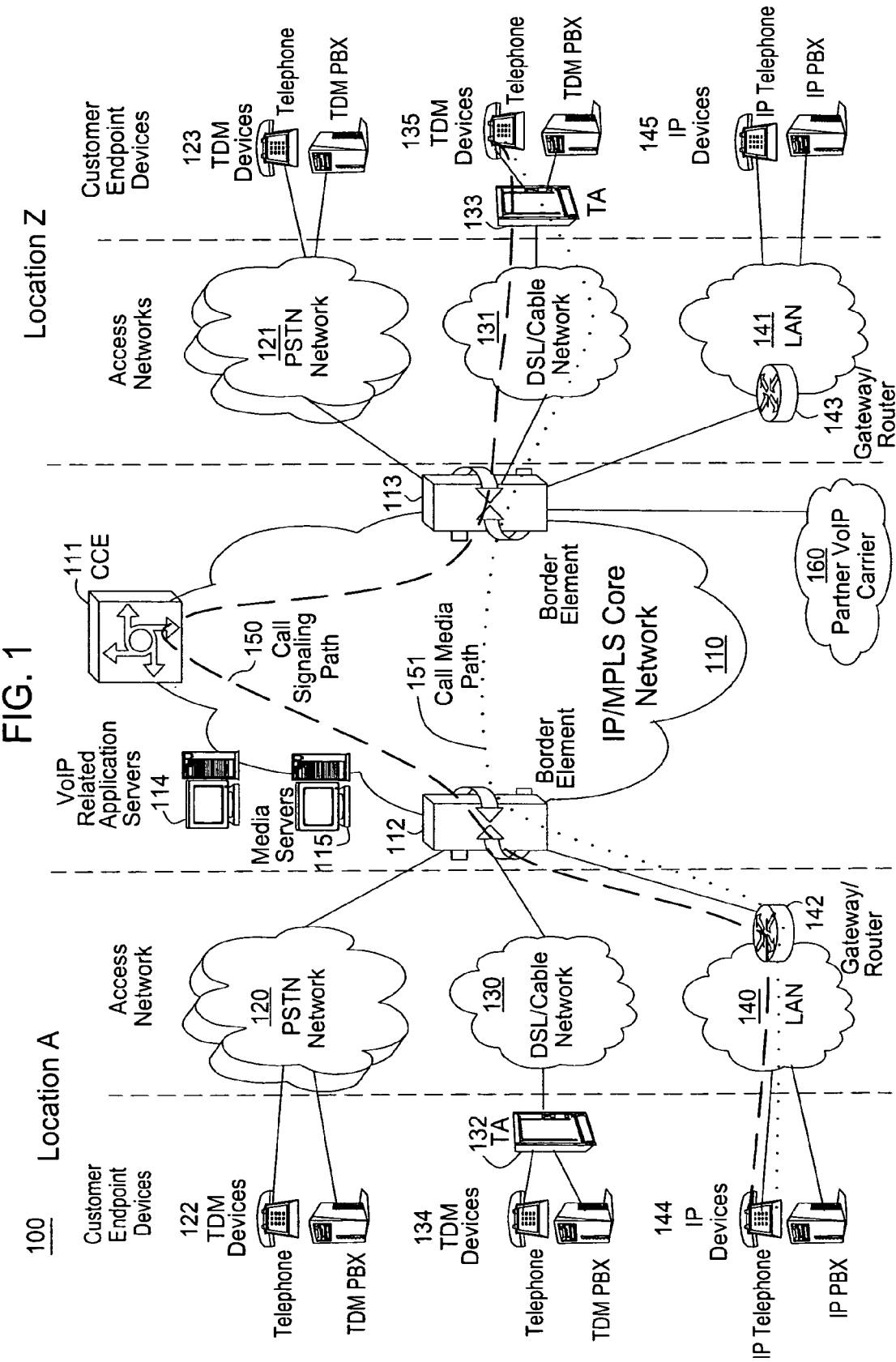
FIG. 1 illustrates an exemplary network related to the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a Voice over Internet Protocol (VoIP) network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

The above VoIP network is described to provide an illustrative environment in which data and voice packets are transmitted on communication networks. As enterprise customers grow their business, they extend their wide area network using VPN services offered by network service providers. An enterprise customer may obtain multiple VPN services spanning different geographical areas, business centers, etc. The network service providers may also have multiple Border Gateway Protocol (BGP) autonomous systems to support their large customer base. Multiple VPNs for a customer may be provided on autonomous systems within the same Interior Gateway Protocol (IGP) or on multiple BGPs. When a customer experiences major organizational change such as mergers, acquisitions, etc., it may be necessary to establish seamless communication among users previously serviced on separate VPNs. For example, enterprise customer A may acquire company B where VPNs for both enterprise customer A and company B may reside on different autonomous systems. The enterprise customer will likely request that the VPNs be combined. In turn, the network service provider supporting the enterprise customer will establish an inter-autonomous-system with complex BGP topology, route reflectors, route filter list, etc. If the number of VPNs being combined is significantly large, then the filter lists will in turn become very large and very difficult to manage. Route reflectors may be required to handle a larger load, thereby affecting the performance of the overall network.

Furthermore, if the multiple autonomous systems supporting the customer are in a single Internal Gateway Protocol (IGP), the network service provider has no means to provide the requested seamless communication. Therefore, there is a need for a method that provides communication for VPNs spanning multiple autonomous systems.

The present invention provides a method and apparatus for providing communication for virtual private networks spanning multiple autonomous systems on packet networks such as VoIP and SoIP networks. In order to clearly illustrate the teachings of the current invention, the following terminologies and networking concepts will first be described:

Virtual Private Network (VPN);
Customer Edge (CE);
Provider Edge (PE);
Border Gateway Protocol (BGP);
Label Distribution Protocol (LDP);
Forward Equivalent Class (FEC);
Label Switched Paths (LSP);
Label Edge Router (LER);
Virtual Route Forwarding (VRF);
Autonomous System (AS);
Interior Gateway Protocol (IGP);
A Route Reflector (RR);
Autonomous System Boundary Router (ASBR); and
A Service Border Router (SBR).

Virtual Private Network (VPN) is a private network that uses a public network to interconnect multiple sites and users. VPN uses virtual connections routed through the public network to connect remote sites, mobile users, corporate LANs, etc. For example, a VPN may have a LAN at a corporation's main office, remote LANs at branch offices and individual employees connecting to these LANs using endpoint devices such as PCs, laptops, mobile devices, etc. The public network may be the Internet or a network from a service provider.

Customer Edge refers to a device located at a customer location and is in communication with a provider edge device as defined below via a data link such as Ethernet, Frame Relay, etc. A customer edge device may be a router or a switch. A customer edge router is a routing peer to the provider edge device to which it is attached but not to other customer edge routers in other sites. In one embodiment, the customer edge device may provide the addresses at its site to the provider edge device using Border Gateway Protocol (BGP) as described below. The routing information about a particular VPN is present only in the PE routers attached to the VPN.

Provider Edge (PE) refers to a device, e.g., a router, administered by a network service provider and is used for communicating with customer edge devices. In one embodiment, a PE obtains routing information from the customer edge devices using border gateway protocol. A PE may be used to attach labels to the customer traffic to identify the VPN associated with the packet. That is, the service provider provides VPN functionality to a set of customers using a PE device at the edge of the provider network.

Border Gateway Protocol (BGP) refers to a protocol designed to pass routing information between systems run by different administrators. BGP has methods for passing attributes of routes between a CE and a PE.

Label Distribution Protocol (LDP) is a protocol used to build label-switched router databases by exchanging label mapping information between two label switched routers.

Forward Equivalent Class (FEC) is a term that describes a set of packets that may be forwarded the same way based on characteristics or requirements. FEC may be defined based on quality of service, destination IP address, etc.

Label Switched Paths (LSP) refers to pre-provisioned routes across an MPLS network using a signaling protocol such as Label Distribution Protocol (LDP) described above. LSPs are a sequence of labels inserted at the beginning of the packets at each device along the path from the source to the destination. The labels contain network protocol and information needed for forwarding packets. The LSPs are setup based on criteria in the Forward Equivalent Class (FEC) defined above.

Label Edge Router (LER) is a router located at the edge of an MPLS network that uses routing information to assign labels to data-grams and forward them into the MPLS domain. Hence, the path for a packet begins at an LER which assigns a label to it based on FEC criteria.

Virtual Route Forwarding (VRF) table refers to a routing information repository that defines the VPN membership of a customer site attached to the Provider Edge (PE) router. A VRF may contain an IP routing table, rules for determining information to be contained in the IP routing table, a forwarding table, a list of interfaces that use the forwarding table, etc. For example, when a service provider provides a VPN service to a customer, the service provider instantiates a VRF for the customer.

Autonomous System (AS) refers to a collection of networks under a common administration sharing a common routing strategy. Autonomous systems are assigned a unique 16-bit number by Internet Assigned Numbers Authority (IANA).

Interior Gateway Protocol (IGP) refers to an Internet protocol used to exchange routing information within an autonomous system, e.g., Open Shortest Path First (OSPF), Routing Information Protocol (RIP), etc.

A Route Reflector (RR) is a router and concentrator used as a central point for internal BGP (iBGP) communication sessions. In order to provide internal BGP communication amongst all provider edge devices without an RR, a full mesh topology needs to be deployed. This full mesh requires N−1 sessions to be established on each PE to create the topology for iBGP sessions. As the number of PEs increases, the mesh topology has a scalability issue. Alternatively, the RR is able to act as a central distribution point for distributing routing information to all PEs in the BGP domain, thereby reducing the number of iBGP sessions on the PEs. A RR servicing VPNs, distributes VPNV4 addresses to all PEs. The VPN route reflector also distributes VPNV4 addresses to VPN route reflectors in other BGP domains. In this case, a multi-protocol external BGP (eBGP) session is established between VPN route reflectors. For example, eBGP session may be established between Autonomous System one (AS1) and Autonomous System two (AS2). Advertised routes between autonomous systems are translated for correct importation into the destination VPNs in the route reflectors.

Autonomous System Boundary Router (ASBR) refers to a router that is connected to more than one AS and exchanges routing information with routers in other ASes. ASBR may run a non-IGP routing protocol, such as BGP to communicate with other routers that may have a different routing strategy. An ASBR is used to distribute routes received from other AS to routers that share the autonomous system with the ASBR.

A Service Border Router (SBR) is a routing device that is placed at the edge of BGP autonomous system domains. The SBR is responsible for advertisement and translation of VPNV4 routes to a remote SBR representing the remote autonomous system. However, the SBR only keeps the routes that it needs as defined by a cross-connect functionality between the pertinent autonomous systems. In this fashion, the SBR behaves like a RR without having to maintain all the route information as required of a RR.

In one embodiment, a service provider with an IP backbone may provide VPN services to enterprise customers. For example, an enterprise customer may outsource its backbone network to a network service provider. As such, each enterprise location has at least one Customer Edge device that is attached to at least one Provider Edge (PE) device. The CEs at a customer location are on a LAN and the traffic from endpoint devices can reach the CEs on the LAN. BGP can be used for obtaining routing information from CEs and for distributing routes over the backbone network. Multi Protocol Label Switching (MPLS) can be used for forwarding the packets over the backbone network. MPLS enables the service provider to pre-provision LSP routes across the network. The service provider may implement the Label Edge Router (LER) functionality in a PE device attached to the customer's CE device. For example, packets reach the PE and are assigned the first label based of FEC prior to being forwarded towards their destination over one of the pre-provisioned paths (LSPs). When a VPN is established for a customer, the service provider creates a Virtual Route Forwarding (VRF) instance for the VPN in the PE device. The VRF table provides the IP routing table, forwarding table, rules, etc. for the specific VPN customer. The PE device then assigns a label for the routes (in the VRF table) and distributes the routes as VPN-IPv4 addresses. The assigned label and the VPN identifier are encoded as part of network layer reach-ability information. The PE device exchanges routes with internal and external peers using VPNV4 and IPV4 addresses, respectively.

The service provider then uses route reflectors to reflect internal routes to routers within an autonomous system. The Autonomous System Border Router (ASBR) receives the routes from the route reflector, and exchanges network reach-ability information, e.g., LSP paths, with other autonomous systems. Specifically, the ASBR re-writes the next-hop to specify its own address as the value of the External Border Gateway Protocol (EBGP) next hop attribute, assigns a new MPLS label, and redistributes the routes to other autonomous systems. It should be noted that an ASBR does not maintain a cross-connect table (as discussed below) between targeted autonomous systems. As a result, ASBRs advertise routes to all targeted and non-targeted autonomous systems. The non-targeted autonomous systems are required to process routes they may never use. It should also be noted, since the ASBR re-writes the next-hop to specify its own address as the value of eBGP next hop attribute, the original sources of the routes are not maintained.

In one embodiment, the current invention discloses a method and apparatus for providing communication for VPNs spanning multiple autonomous systems by using an SBR, without the need for inter-autonomous system route reflectors and the need for re-writing the next-hop information. The SBR performs mapping of VPN routes, e.g., VPNV4 routes, between autonomous systems based on the VRFs configured on each autonomous system. For example, a cross-connect table may couple a VRF in AS1 with a VRF in AS2. The SBR rewrites the route target and the original source of the route (i.e. next-hop) is maintained. Pair-wise traffic among PEs follows the best path between the multiple autonomous systems. Note that, the SBR only keeps the routes that it needs as defined by the cross-connect table, which is similar to a VRF table used in a PE.

Figure 2:
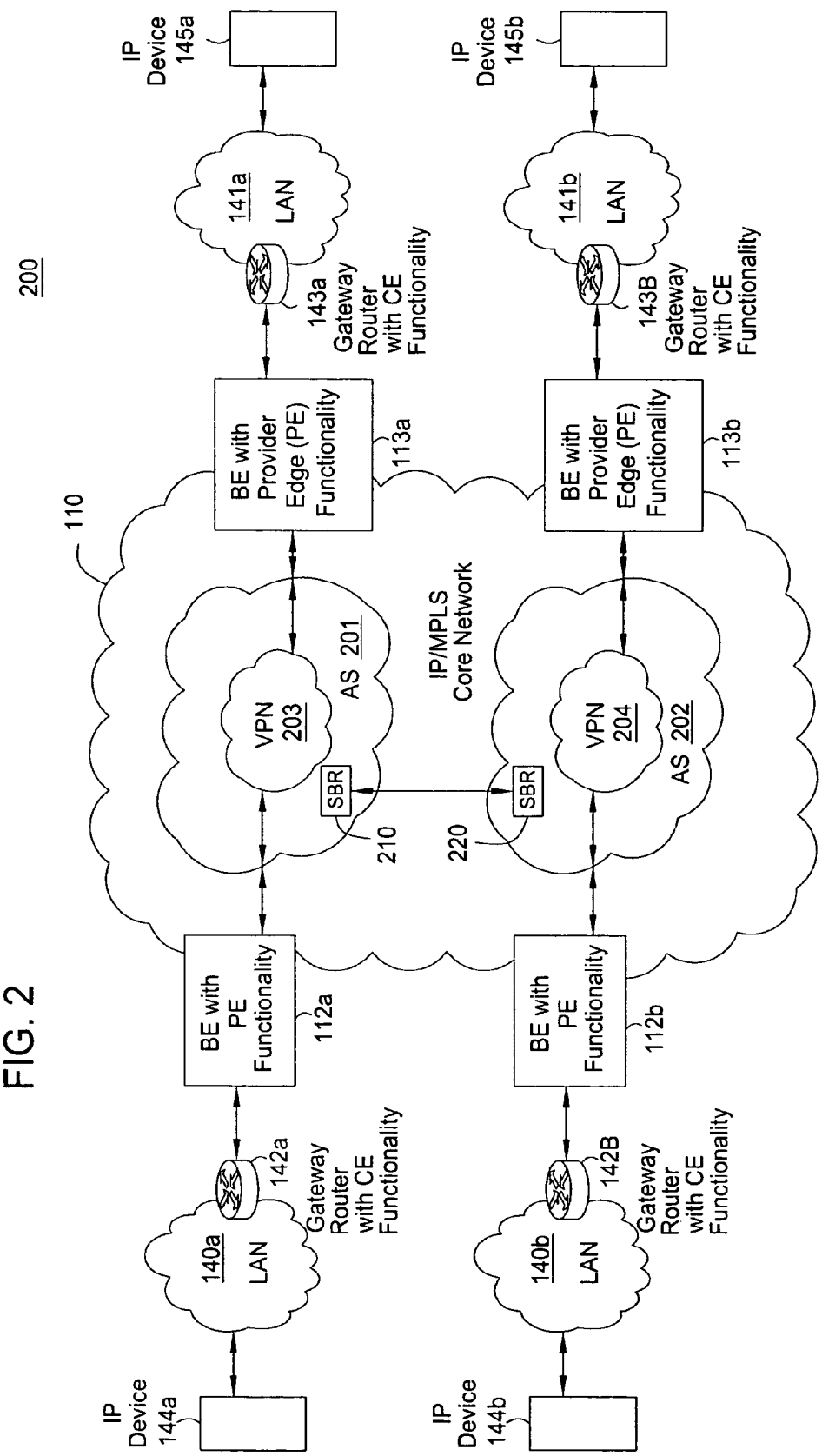
FIG. 2 illustrates an exemplary network with the current invention for providing communication for VPNs spanning multiple autonomous systems.

FIG. 2 illustrates an exemplary network 200 with one embodiment of the current invention for providing communication for VPNs spanning multiple autonomous systems. For example, two separate VPNs, provided for a customer on two autonomous systems, may be combined to form a single VPN spanning the two autonomous systems. In this example, the customer is using IP devices 144*a* and 144*b* to access IP services. The customer also has users at remote locations using IP devices 145a and 145b to access IP services. IP devices 144a and 144b are connected to access networks 140a and 140b (e.g., LANs), respectively. Access network 140a contains a gateway router 142a and access network 140b contains a gateway router 142b. Gateway routers 142a and 142b are connected to an IP/MPLS core network 110 through border elements 112a and 112b. The IP devices 145a and 145b are connected to access networks 141a and 141b (e.g., remote LAN networks). The access networks 141a and 141b contain gateway routers 143a and 143b, respectively. The gateway routers 143a and 143b are connected to the IP/MPLS core network 110 through border element 113a and 113b, respectively. The CE functionality is provided in the gateway routers 142a, 142b, 143a and 143b. The PE functionality is provided in the border elements 112a, 112b, 113a and 113b. A VPN 203 is established through the IP network 110 to connect the access networks 140a and 141a in Autonomous System (AS) 201. Another VPN 204 is established to connect the access networks 140b and 141b in autonomous system 202. Subsequently, the customer requests that the two VPNs be combined to form a single VPN that connects access networks 140a, 140b, 141a and 141b. In one embodiment, the service provider implements Service Border Routers (SBR) 210 and 220 for providing communication for VPN spanning autonomous systems 201 and 202.

The SBRs perform mapping of VPNV4 routes between the autonomous systems 210 and 220 based on the VRFs configured on each autonomous system. For example, a cross-connect table may be configured by the network service provider for coupling a VRF in AS 201 with a VRF in AS 202, i.e. merging of the two sets of VPN memberships. Each of the SBRs 210 or 220 then keeps only the routes that it needs as defined by the cross-connect table for connecting all member sites among the autonomous systems 201 and 202. Note that the cross-connect table is a pair-wise table. If there are "n" autonomous systems all sharing VPN memberships, "n(n−1)/2" pair-wise cross-connect tables are maintained. For example, if there are 5 autonomous systems, a separate cross-connect table is maintained for connecting each autonomous system to one of the other 4 autonomous systems. SBRs limit route propagation to targeted autonomous systems. For example, if merging of two VPNs is needed only between two of the 5 autonomous systems in the above example, the route propagation is limited to the two pertinent autonomous systems. That means, the other 3 autonomous systems are non-targeted and the routes are not propagated to these non-targeted autonomous systems. Hence, downstream filtering of routes by non-targeted autonomous systems is not needed.

The SBRs 210 and 220 rewrite the route targets to maintain the next-hop information as being the original source of the routes. Note that unlike ASBRs that specify their own address as the value of next-hop attribute, SBRs maintain the original source of the route as the next-hop attribute. Pair-wise traffic among PEs 112a, 112b, 113a and 113b follows the best path between the autonomous systems 201 and 202. Note that only the network elements used to describe the invention are illustrated in FIG. 2. It is not intended to show all network elements used to deliver a VoIP or SoIP service.

Figure 3:
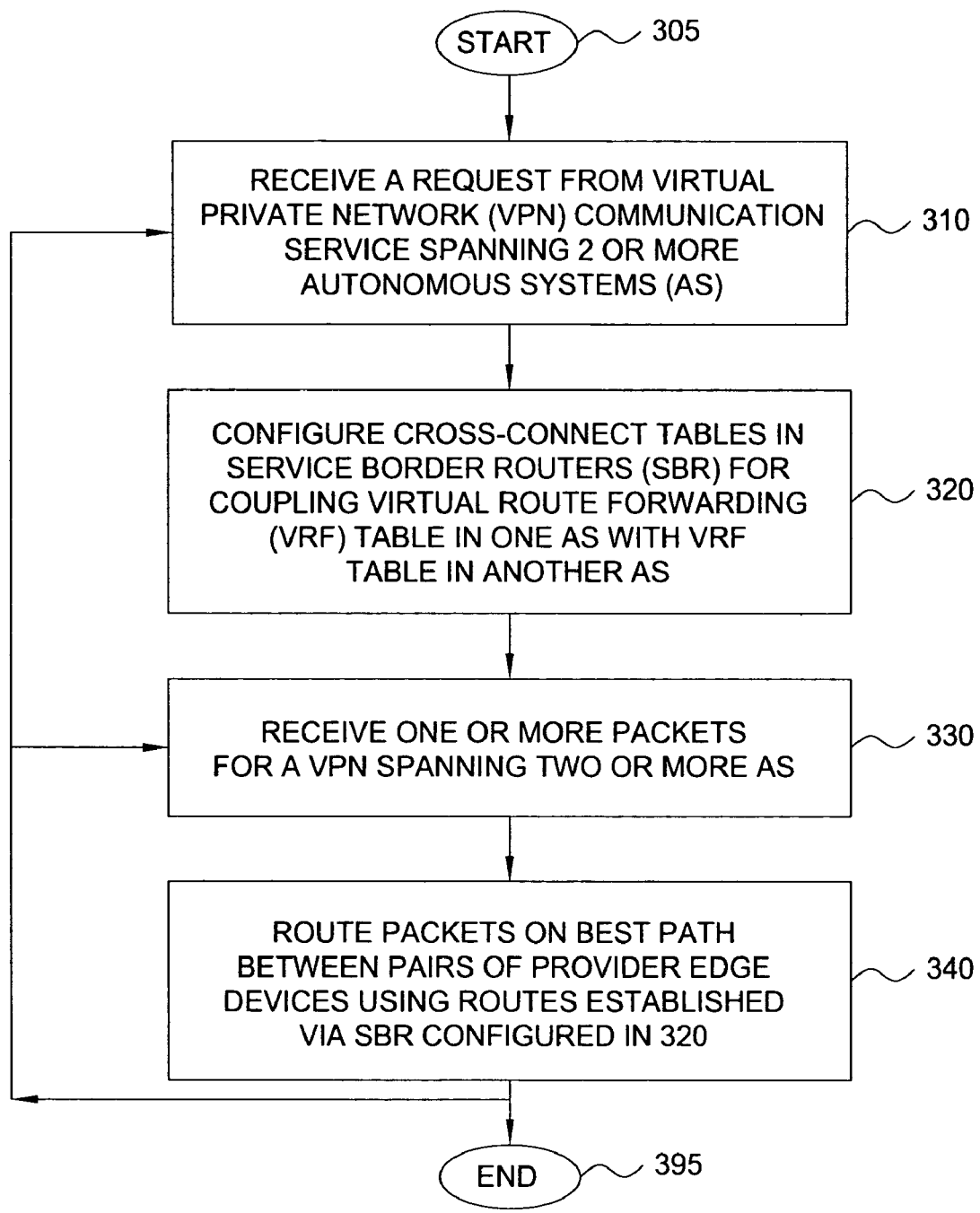
FIG. 3 illustrates a flowchart of a method for providing communication for VPN' spanning multiple autonomous systems.

FIG. 3 illustrates a flowchart of one embodiment of the current method 300 for providing communication among VPNs spanning multiple autonomous systems. The service provider first implements SBRs for performing mapping of VPN routes, e.g., VPNV4 routes, between autonomous systems based on the VRFs configured on each autonomous system. The service provider then configures pair-wise cross-connect tables in each SBR for coupling VRFs in two autonomous systems. The service provider also enables SBRs to rewrite route targets such that the next-hop information (original sources of the routes) is maintained.

Method 300 starts in step 305 and proceeds to step 310. In step 310, method 300 receives a request for VPN communication spanning multiple ASes. For example, a customer that may have been receiving multiple VPN services on various autonomous systems requests a single VPN service spanning multiple autonomous systems. In another example, two VPN customers merge and the VPN communication needs to be combined accordingly.

In step 320, method 300 configures cross-connect tables in SBRs, for coupling VRFs in one AS with VRFs in another AS. Each SBR then keeps only the routes that it needs as defined by the cross-connect table. For example, the two autonomous systems may be exchanging VPNV4 information via SBRs for other customers. Both SBRs are then updated to couple the particular VRFs in the two autonomous systems for the current customer request.

In one embodiment, the service provider establishes one-to-many cross-connect tables for VPN communication spanning 2 or more autonomous systems.

In step 330, method 300 receives packets for a VPN spanning multiple autonomous systems. For example, a packet with a destination address in a different autonomous system is received from a CE device.

In step 340, method 300 routes packets on best path between pairs of PE devices. For example, the packet is routed on shortest path, lowest latency path, etc. between the source and destination PE devices. This enables the VPN network to provide seamless communication among all sites on lowest latency paths by retaining next-hop information.

The method then proceeds to step 395 to end the current request, to step 310 to continue receiving requests for VPN communication, or to step 330 to continue receiving packets.

Figure 4:
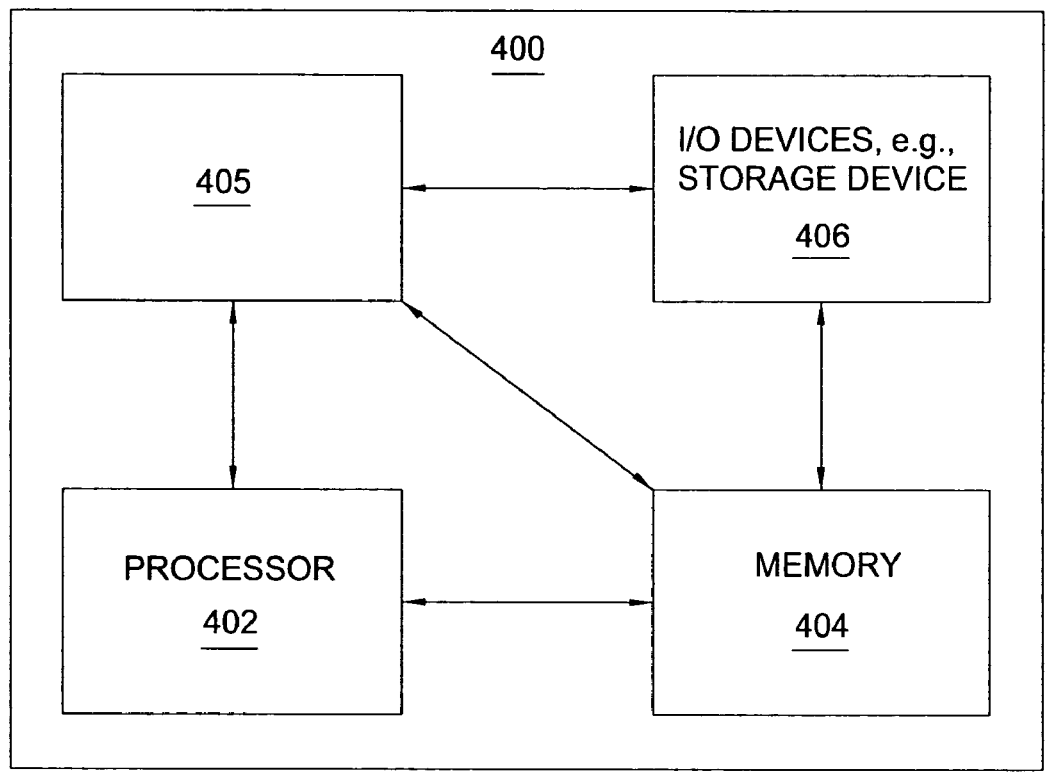
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing VPN communication spanning multiple autonomous systems, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing VPN communication spanning multiple autonomous systems can be loaded into memory 404 and executed by processor 402 to implement the functions as discussed above. As such, the present method 405 for providing VPN communication spanning multiple autonomous systems (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing virtual private network communication spanning a first autonomous system and a second autonomous system, comprising:
    providing a first service border router in the first autonomous system; and
    providing a second service border router in the second autonomous system, where the first service border router and the second service border router perform mapping of virtual private network routes between the first and second autonomous systems based on a virtual route forwarding table configured on each of the first and second autonomous systems, where the first service border router and the second service border router only maintain routes that are needed to provide a cross-connect functionality between the first and second autonomous systems, wherein the routes that are maintained are only routes that connect the first autonomous system with the second autonomous system and exclude any other routes to any other autonomous systems.

2. The method of claim 1, further comprising:
    enabling each of the first service border router and the second service border router to rewrite a route target for a packet.

3. The method of claim 1, wherein the virtual route forwarding table configured on each of the first and second autonomous systems is used to configure a cross-connect table in each of the first service border router and the second service border router.

4. The method of claim 1, further comprising:
    receiving a packet for a virtual private network spanning the first and second autonomous systems; and
    routing the packet on a route between a pair of provider edge devices, where the route is established via the first service border router and the second service border router.

5. The method of claim 1, wherein the virtual private network routes are virtual private network version 4 routes.

6. The method of claim 1, wherein the first and second autonomous systems are part of an internet protocol network.

7. The method of claim 2, wherein the enabling each of the first service border router and the second service border router to rewrite the route target is performed while maintaining next-hop information.

8. A non-transitory computer-readable medium having stored thereon a plurality of instructions, the plurality of instructions including instructions which, when executed by a processor, cause the processor to perform a method for providing virtual private network communication spanning a first autonomous system and a second autonomous system, comprising:
    providing a first service border router in the first autonomous system; and
    providing a second service border router in the second autonomous system, where the first service border router and the second service border router perform mapping of virtual private network routes between the first and second autonomous systems based on a virtual route forwarding table configured on each of the first and second autonomous systems, where the first service border router and the second service border router only maintain routes that are needed to provide a cross-connect functionality between the first and second autonomous systems, wherein the routes that are maintained are only routes that connect the first autonomous system with the second autonomous system and exclude any other routes to any other autonomous systems.

9. The non-transitory computer-readable medium of claim 8, further comprising:
    enabling each of the first service border router and the second service border router to rewrite a route target for a packet.

10. The non-transitory computer-readable medium of claim 8, wherein the virtual route forwarding table configured on each of the first and second autonomous systems is used to configure a cross-connect table in each of the first service border router and the second service border router.

11. The non-transitory computer-readable medium of claim 8, further comprising:
    receiving a packet for a virtual private network spanning the first and second autonomous systems; and
    routing the packet on a route between a pair of provider edge devices, where the route is established via the first service border router and the second service border router.

12. The non-transitory computer-readable medium of claim 8, wherein the virtual private network routes are virtual private network version 4 routes.

13. The non-transitory computer-readable medium of claim 8, wherein the first and second autonomous systems are part of an internet protocol network.

14. The non-transitory computer-readable medium of claim 9, wherein the enabling each of the first service border router and the second service border router to rewrite the route target is performed while maintaining next-hop information.

15. An apparatus for providing virtual private network communication spanning a first autonomous system and a second autonomous system, comprising:
    a first service border router in the first autonomous system; and
    a second service border router in the second autonomous system, where the first service border router and the second service border router perform mapping of virtual private network routes between the first and second autonomous systems based on a virtual route forwarding table configured on each of the first and second autonomous systems, where the first service border router and the second service border router only maintain routes that are needed to provide a cross-connect functionality between the first and second autonomous systems, wherein the routes that are maintained are only routes that connect the first autonomous system with the second autonomous system and exclude any other routes to any other autonomous systems.

16. The apparatus of claim 15, wherein each of the first service border router and the second service border router is enabled to rewrite a route target for a packet.

17. The apparatus of claim 15, wherein the virtual route forwarding table configured on each of the first and second autonomous systems is used to configure a cross-connect table in each of the first service border router and the second service border router.

18. The apparatus of claim 15, wherein
    a packet for a virtual private network spanning the first and second autonomous systems is received within one of the first and second autonomous systems; and
    wherein the packet is routed on a route between a pair of provider edge devices, where the route is established via the first service border router and the second service border router.

19. The apparatus of claim 15, wherein the first and second autonomous systems are part of an Internet protocol network.

20. The apparatus of claim 16, wherein the enabling each of the first service border router and the second service border router to rewrite the route target is performed while maintaining next-hop information.

* * * * *